United States Patent
Dutta et al.

(10) Patent No.: US 7,657,539 B2
(45) Date of Patent: Feb. 2, 2010

(54) SYSTEM AND COMPUTER PROGRAM PRODUCT FOR FACILITATING CUSTOMS PLANNING AND CLEARANCE

(75) Inventors: Rabindranath Dutta, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/170,169

(22) Filed: Jul. 9, 2008

(65) Prior Publication Data

US 2008/0262951 A1   Oct. 23, 2008

Related U.S. Application Data

(63) Continuation of application No. 09/915,438, filed on Jul. 26, 2001, now Pat. No. 7,426,514.

(51) Int. Cl.
G06F 17/30 (2006.01)
H04M 15/00 (2006.01)

(52) U.S. Cl. .......................... 707/10; 705/34
(58) Field of Classification Search ................... 707/10; 705/34

See application file for complete search history.

(56) References Cited

OTHER PUBLICATIONS

Andrea MacDonald. "Factoring Tax And Duty Into The Investment Equation." World Trade Oct. 1, 2004: ABI/INFORM Global, ProQuest. Web. Aug. 3, 2009.*

* cited by examiner

Primary Examiner—Matthew S Gart
Assistant Examiner—Oluseye Iwarere
(74) Attorney, Agent, or Firm—John Biggers; Jill Poimboeuf; Biggers & Ohanian LLP.

(57) ABSTRACT

Facilitating customs planning and clearance including creating in an international customs server, in response to a signal communicated through a client device coupled for data communications through at least one internet connection to the international customs server, a master customs planning record; creating a related customs planning record wherein the related customs planning record is related to the master customs planning record; calculating duty on the goods described in the related customs planning record; storing the amount of the calculated duty in the related customs planning record; incrementing the total amount of duty stored in the duty total field in the master customs planning record; submitting, to the destination country, payment of the duty; creating, in dependence upon the related customs planning record, a customs declaration form for a destination country; and submitting the customs declaration form to a customs declaration forms database for the destination country.

40 Claims, 6 Drawing Sheets

SYSTEM AND COMPUTER PROGRAM PRODUCT FOR FACILITATING CUSTOMS PLANNING AND CLEARANCE

CROSS-REFERENCE TO RELATED APPLICATION

This application is a continuation application of and claims priority from U.S. patent application Ser. No. 09/915,438, filed on Jul. 26, 2001.

BACKGROUND OF THE INVENTION

1. Field of the Invention

The field of the invention is methods and systems for facilitating international travel, and more particularly, methods and systems for facilitation of customs planning.

2. Description of Related Art

Customs regulations govern the movement of goods into and out of a country. With advances in technology, the world is becoming a smaller place. The quantity of goods moved in international trade has grown phenomenally in the recent past. Crossing borders with goods, however, entails adherence to different sets of rules and regulations for different nations. Every international traveler has to pass through customs checks and these checks are some of the most irritating and time-consuming aspects of international customs planning and clearance. The emergence of new technologies in the form of wired or wireless data communications has offered new opportunities for improved traveling and customs clearance experiences while complying with customs regulations.

Goods can be excludable or dutiable for many reasons, many of which are very difficult to analyze in advance. In the United States, for example, at the time of this writing, there are import restrictions regarding origins of goods, as for example, goods from Cuba, Afghanistan, Iran, Iraq, Libya, Serbia, and Sudan. There are restrictions on categories of goods, as for example, fish and wildlife products, food and plant products, alcohol, tobacco, firearms, ammunitions, medicines, and narcotics. There are trademark and copyright limitations on imports of counterfeit goods.

Even professional importers find it difficult to import goods without violating customs regulations. The U.S. Department of Commerce has a program, known as the "Informed Compliance Strategy," designed to improve voluntary compliance with U.S. customs regulations. The program is founded upon the observations, among other things, that (1) more than sixty percent of U.S. import value is attributable to the top 1000 importers, (2) about twenty percent of imports fail to comply with U.S. customs regulations, and (3) most such failures to comply are honest. The U.S. Customs Service's administrative regulations known as the "Customs Valuation Encyclopedia," subtitled "An Informed Compliance Publication," in its January 2001 version, is 452 pages in length. Even honest, professional, expert importers cannot figure out how to import goods into the United States without violating customs regulations.

The difficulty of complying with customs regulations is compounded across many countries, and is essentially unmanageable for typical international travelers who are not professional importers. Typical international travelers are presented with customs declarations forms on board aircraft, trains, or ships at sea a short time before arriving at a customs check point in an air terminal, port, or border crossing. For example, in arriving in the United States, travelers are typically required to complete a Declaration, U.S. Customs Form CF-6059B, and, for goods that the traveler shipped separately, a Declaration of Unaccompanied Articles, U.S. Customs Form CF-255. The forms make no pretense of providing full explanations of the customs regulations. Even if the forms did fully explain importability and dutiability of goods declared, it would be too late. The goods are already purchased, in the possession of the traveler, and the plane, ship, or train is already nearing the customs check point.

The scope and application of such customs rules and regulations, moreover, varies considerably from nation to nation. It is very difficult, given present information availability and systems quality, to know with certainty in advance of arriving in a port of entry, for example, whether goods will be excluded or subjected to duty. Travelers can easily find their plans frustrated or ruined. It is a particular difficulty that the duties to be paid upon declared goods are not known to traveling importers, if ever, until just before arriving at a port of entry. Moreover, there is no usefully organized way in the prior art for traveling importers to know the cumulative effect, in terms of duties, of importing various quantities of goods among one or more countries. Moreover, there is no way in the prior art for traveling importers to pay customs duties in advance of arrival at a port of entry.

For all these reasons, therefore, there is an ongoing need for improvements in methods and systems for, and the experience of, international customs planning.

SUMMARY OF THE INVENTION

Aspects of the invention include methods for facilitating customs planning and clearance including creating in an international customs server, in response to a signal communicated through a client device coupled for data communications through at least one internet connection to the international customs server, a master customs planning record; creating in an international customs server a related customs planning record, wherein the related customs planning record is related through a foreign key field to the master customs planning record; calculating duty on the goods described in the related customs planning record; storing the amount of the calculated duty in the duty amount field in the related customs planning record; and incrementing, by the amount of the calculated duty stored in the duty amount field in the related customs planning record, the total amount of duty stored in the duty total field in the master customs planning record.

In typical embodiments, the master customs planning record includes a master identification field in which is stored a master identity code for the master customs planning record, and a duty total field in which is stored the total amount of duty to be paid on goods identified in related customs planning records. In typical embodiments, the master customs planning record further includes an importer identification field in which is stored an identity of an importer.

In typical embodiments, the related customs planning record includes the foreign key field in which is stored the master identity code of the master customs planning record; one or more description fields describing the goods for import to a destination country, the destination country having an identity; a duty amount field in which is stored an amount of duty to be paid on the goods; and the identity of the destination country. The description fields used for describing goods for import in the related customs planning records include a text description field in which is stored a textual description of the goods for import, a category field in which is stored a code identifying the category of the goods for import, and a quantity field in which is stored the quantity of goods for import. In typical embodiments, the related customs planning record further includes an importer identification field in which is stored an identity of an importer.

In typical embodiments, each related customs planning record represents a prospective importation into a destination country of a quantity of goods of a category. Typical embodiments include creating, in dependence upon the related customs planning record, a customs declaration form for a destination country and submitting the customs declaration form to a customs declaration forms database for the destination country. Typical embodiments also include submitting, to the customs service of the destination country, payment of the duty.

In typical embodiments, client devices include kiosks at an airport, workstations installed in the back of passenger chairs in airplanes, personal computers, and hand-held personal data administrators. In many embodiments, at least one internet connection is wireless. In typical embodiments, the international customs server is a software application installed and operating on one or more computers, the software application further comprising software routines storing and retrieving related customs planning records, validating goods described in related customs planning records against customs regulations stored in customs regulations databases, and submitting to customs databases declaration forms prepared in dependence upon the related customs planning records.

Typical embodiments include creating in dependence upon the related customs planning record a customs declaration form for the destination country further comprises reading customs data from a related customs planning record and inserting the read customs data into a declaration form. In typical embodiments, submitting the customs declaration form to a customs declaration forms database for the destination country further comprises communicating the form as electronic data communications through at least one internet connection.

Typical embodiments include validating goods described in a related customs planning record. In typical embodiments, validating the related customs planning records includes comparing the goods described by customs data in the related customs planning record to customs regulations governing the goods described by the customs data in the related customs planning record and reporting to an importer through the client device a result of the comparison. Typical embodiments include storing the result of the comparison in the related customs planning record. In typical embodiments, the related customs planning record comprises a related customs planning record form having a structure, wherein the structure of the related customs planning record form is dependent upon customs regulations.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF EXEMPLARY EMBODIMENTS

Introduction

Figure 1:
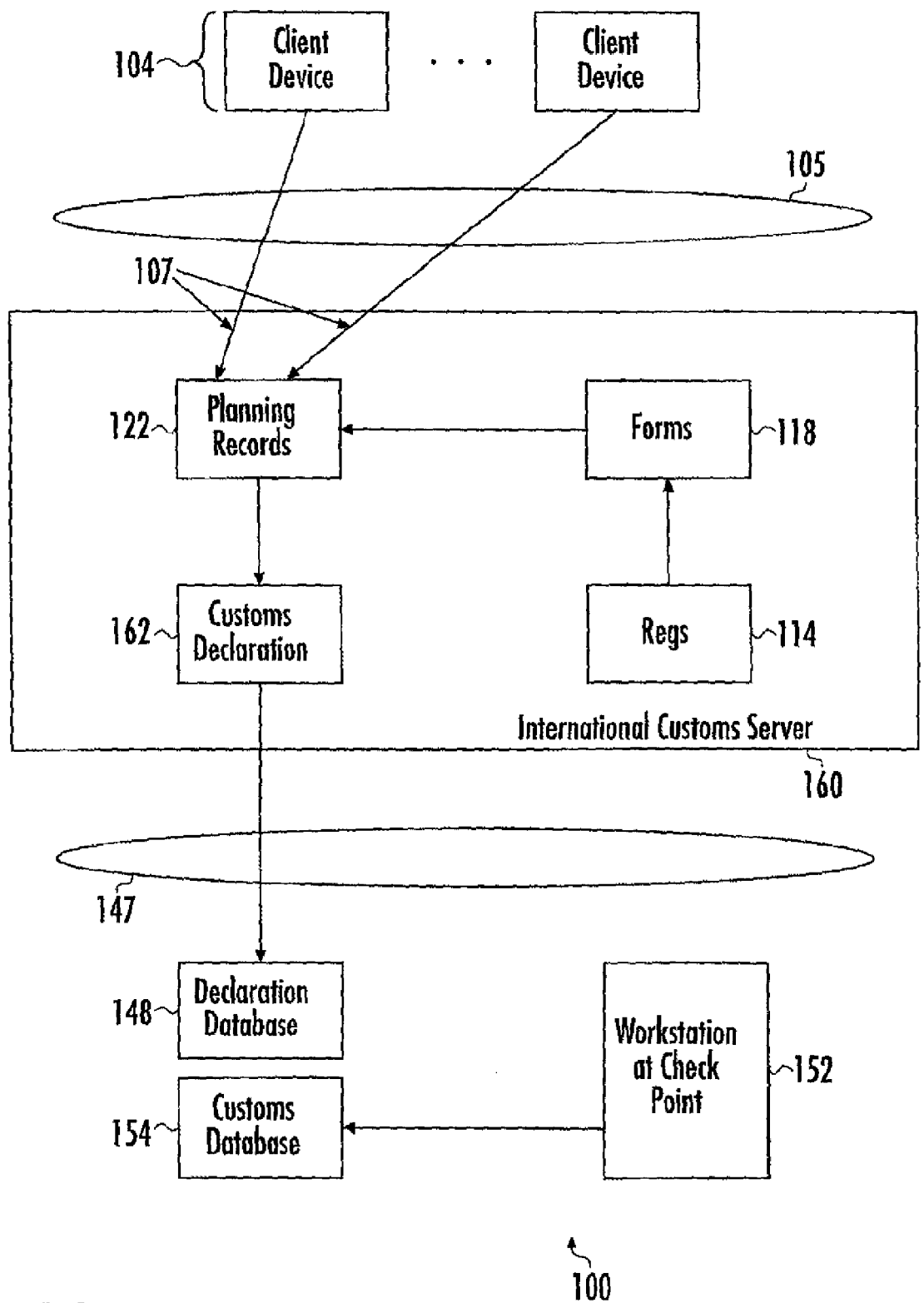
FIG. 1 is a block diagram of an embodiment of the invention.

The present invention is described primarily in terms of methods for facilitating customs planning and clearance. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the terms "field," "data element," and "attribute" are used as synonyms, referring to individual elements of digital date. Aggregates of data elements are referred to as "records" or "data structures." Definitions of complex data structures that include member methods, functions, or software routines in addition to data elements are referred to as "classes." Instances of complex data structures are referred to as "objects" or "class objects."

The terms "client," "client device," and "device" are used as synonyms in this specification, referring to any device capable of accessing a server through a network. Examples of client devices are personal computers, special purpose devices that are client, internet-capable personal data organizers, and others that will occur to those of skill in the art. Various embodiments of client devices are capable of wired and/or wireless network access. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more content servers is well within the scope of the present invention.

"World Wide Web," or more simply "the web," refers to the well-known system of internet protocol ("IP") servers that support specially formatted documents, documents formatted in a language called HTML for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Duty" is the amount of money an importer pays on items coming from another country. Duty is a kind of tax or tariff collected on imported goods.

"Dutiable" describes items on which duty is required to be paid. Most items have specific duty rates, which are determined by a number of factors, including where the importer acquired the item, where it was made, and what it is made of.

To "declare" means to tell a customs official officer about any item acquired abroad that an importer wishes to bring into a country. Most customs declarations are written; some are oral. For example, importers typically are required to declare alterations made in a foreign country to a suit the importer already owned, and importers are typically required to declare any gifts acquired in other countries. The official customs forms described in this specification generally are forms in the nature of customs declarations, sometime referred to simply as "customs forms," "declaration forms," or "declarations."

An "importer" is a person responsible for importing, or sometimes exporting, goods through customs. In this specification, the term "importer" is used generally to refer to a person responsible for moving goods through customs, whether the motion is an export or an import. Importers include owners of goods, purchasers of goods, consignees of shipments or merchandise, and persons holding import licenses or export licenses when such licenses are required by the customs regulations of any country.

DETAILED DESCRIPTION

Turning now to FIG. 1, a first aspect of the invention is seen embodied as a system (100) for facilitating international customs planning and clearance. The illustrated embodiment comprises an international customs server (160) where the international customs server itself includes means for creating and storing in response to signals (107) communicated through client devices (104) customs planning records (122). The illustrated embodiment includes means for creating (160), in response to signals (107) communicated through client devices (104) customs planning records (122) to be stored within an international customs server (160). The client devices in typical embodiments, as in the embodiment shown in FIG. 1, are coupled for data communications through an internet (105) to the international customs server (160). The international customs server is means for creating customs planning records in that the server is a collection of computer programs installed and operating upon one or more computers including computer processors and computer memory. In the illustrated embodiment, the international customs server itself comprises customs planning records (122), customs planning record forms (118), customs regulations (114), and declaration forms (162).

In the embodiment of FIG. 1, the customs regulations are customs rules and regulations, organized by country, governing import and export of goods to and from countries. The customs planning record forms are data structures containing data elements identifying and setting forth information pertinent to customs clearance in destination countries. The customs planning record forms are defined in dependence upon the customs regulations.

In the illustrated embodiment, the customs planning records are data structures that identify and describe a particular importation of goods into a destination country, an event of international customs planning and clearance upon one occasion for an importer. The structure of the customs planning records, that is, the data elements within the customs planning records, are derived from the customs planning record forms (118). In the illustrated embodiment, the declaration forms (162) are official declaration forms prepared on-line within the international customs server using information entered by an importer into a customs planning record.

The system embodiment as shown in FIG. 1 is capable of preparing declaration forms (162) on-line and forwarding them electronically to a customs database (148) in a destination country. In typical embodiments, the electronic forwarding is accomplished via an internet (147). Declaration forms in a destination country's declaration forms database are available for use by customs personnel through customs workstations (152). Upon import of goods into a destination country, in typical embodiments, a customs workstation is capable of forwarding a completed and approved electronic customs form to a central or national customs database (154), such as, for example, the one known in the United States as "ACS," the Automated Commercial System that the United States uses to track, control, and process all commercial imports. As of this writing, the example ACS is scheduled in the United States for a massive upgrade known as "ACE," the Automated Commercial Environment.

In accordance with the illustrated embodiment, the client devices (104) can be wireless devices or they can be coupled electronically to the international customs server. The client devices in various embodiments of the invention include workstations in kiosks at airports, workstations installed in the backs of passenger chairs in airplanes, personal computers, and hand-held personal data administrators. Persons skilled in art will realize that any device capable of functioning as a client or terminal to computer application software comprising a server, any device capable of supporting an internet connection, any device capable of supporting a web client or browser in client-server environments or the environment of the World Wide Web is useful as a client device within the scope of the present invention. In fact, there are many different kinds of such devices that will occur to those of skill in the art, and all of them useful as described are well within the scope of the invention.

Figure 2:
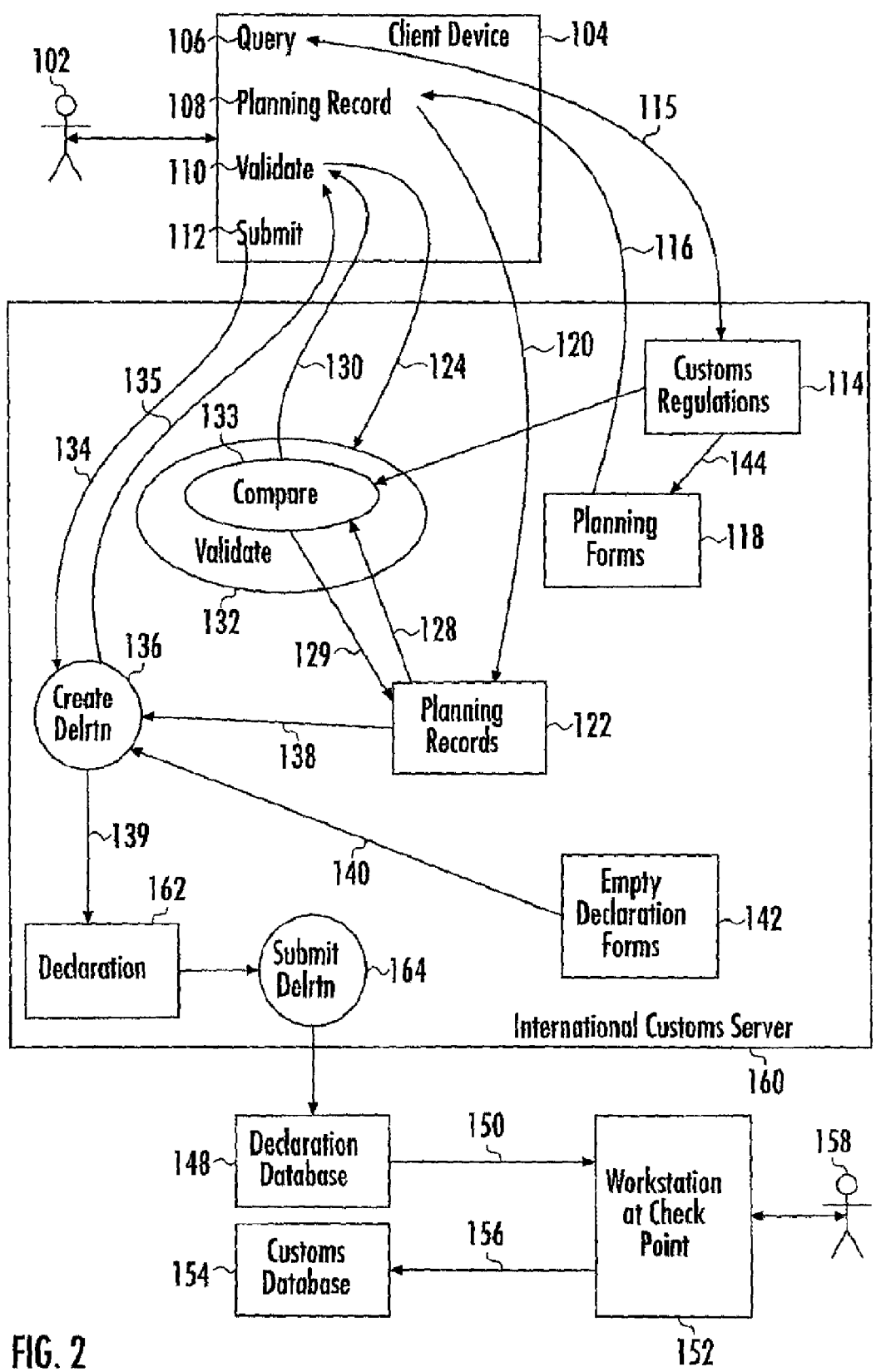
FIG. 2 is a process flow diagram of various exemplary aspects and embodiments of the invention.

Turning now to FIG. 2, a further first aspect of the invention is seen as methods for facilitating international customs planning and clearance. A first embodiment illustrated in FIG. 2 includes creating, in response to a signal (120) communicated through a client device coupled for data communications via an internet to an international customs server (160), a customs planning record (122) to be stored within the international customs server. The illustrated embodiment includes also creating (136) in dependence upon the customs planning record, a customs declaration form (162) for the destination country. The illustrated embodiment further includes submitting (164) the customs declaration form to a customs declaration forms database (148) for the destination country.

In typical embodiments, customs planning records (122) comprise customs planning record forms (118), wherein the customs planning record forms (118) are dependent (144) upon customs regulations (114). More specifically, in order for the customs data in the customs planning records to be used, as it eventually is intended in typical embodiments, for creating declaration forms, the customs planning records record data pertinent to the customs declaration forms of the destination country for import of particular goods for a particular importer.

For example, a purchasing agent, a business traveler, a citizen and resident of the U.S. who is returning from a purchasing trip in the United Kingdom will typically wish to create and submit as a customs declaration form a United States Customs Form CF-6059B. The conclusion that the pertinent form is a CF-6059B depends upon customs regulations for the United States stored in a customs regulations database as part of an international customs server. The customs planning record created for this example American returning with goods purchased in Great Britain will typically therefore be formulated to include the data needed to create a U.S. Customs Form CF-6059B, including for example, countries of origin and categories of goods sought to be imported into the United States.

This is the sense in which, in typical embodiments, customs planning records (122) comprise customs planning record forms (118), wherein the customs planning record forms (118) have structures that are dependent upon customs regulations. And as shown in FIG. 2, in embodiments of the kind illustrated, if the example American is taken as the importer (102), then when the importer (102) requests (108) a customs planning record, the international customs server retrieves (116) from among the customs planning record forms (118) a customs planning record form having data elements appropriate to import of goods from England to the United States, and provides a copy of the customs planning record form, which, after the traveler provides the information comprising the form, is stored (120) as a customs planning record (122).

Persons of skill in the art will recognize immediately that client devices include workstations in kiosks in airports as well as workstations installed in the back of a passenger chairs in airplanes. Typical embodiments of the invention utilize as client devices personal computers and hand-held personal data administrators. Other client devices useful with the present invention will occur to those of skill in the art, and all such client devices are well within the scope of the present invention.

In the embodiment illustrated, all of the communications between the client device (104) and the international customs server (160), including for example the communications indicated by reference numbers (115), (116), (120), (124), (130), (134), and (135), are implemented through internet connections. In some embodiments the internet connections are wireless. In some embodiments internet connections are implemented through wired connections. As internet connections are one kind of network connection, other embodiments implement data communications between the client device and the international customs server by use of intranets, internets, direct dial-up connections, or dedicated lines. Any means of data communication between the client device and the international customs server are well within the scope of the present invention.

Moreover, it is useful to note that a client device in some embodiments is not a client in the sense of traditional client-server architectures because the international customs servers of the present invention are implemented in typical embodiments as Web servers, HTTP servers, and client devices are typically implemented with browsers. Because internet-enablement is so typical among embodiments of the present invention, for convenience, this specification refers to a device used by an importer to communicate with an international customs server as a client device. In fact, the use of any device capable of implementing a data communications connection of any kind and communicating commands or requests and receiving responses to and from an international customs server is well within the scope of the present invention.

In typical embodiments of the kind illustrated in FIG. 2, customs planning records (122) comprise customs data describing goods for import, the customs data including identification of importers, identification of destination countries, identification of countries of origin, and identification of categories of goods. In embodiments of the kind illustrated, the international customs server (160) is a software application installed and operating on one or more computers, the software application further comprising software routines for storing (120) and retrieving (128, 138) customs planning records, validating (132) goods described in customs planning records against customs regulations stored in customs regulations databases (114), and submitting (164) to customs databases (148) declaration forms (162) prepared in dependence upon (138) the customs planning records (122).

Embodiments of the kind illustrated typically include creating (136) in dependence upon customs planning records (122), declaration forms (162) for destination countries, as well as reading (138) customs data from a customs planning record (122) and inserting (139) the read customs data into a customs declaration form (162). Embodiments of the kind illustrated typically include submitting (164) the customs declaration form (162) to a customs declaration forms database (148) for the destination country. In typical embodiments, submitting the declaration form includes communicating the form as electronic data communications through at least one data communications connection. In typical embodiments, the data communications connection is an internet connection.

Embodiments of the kind illustrated typically include a capability of validating (132) the goods described in a customs planning record (122). In typical embodiments, validating goods described in a customs planning record includes comparing (133) the goods described by customs data in the customs planning record (122) to customs regulations (114) governing the goods described by the customs data in the customs planning record and reporting (130) to the importer (102) through the client device (104) a result of the comparison. In some embodiments, validating includes storing (129) the result of the comparison in the customs planning record.

Figure 4:
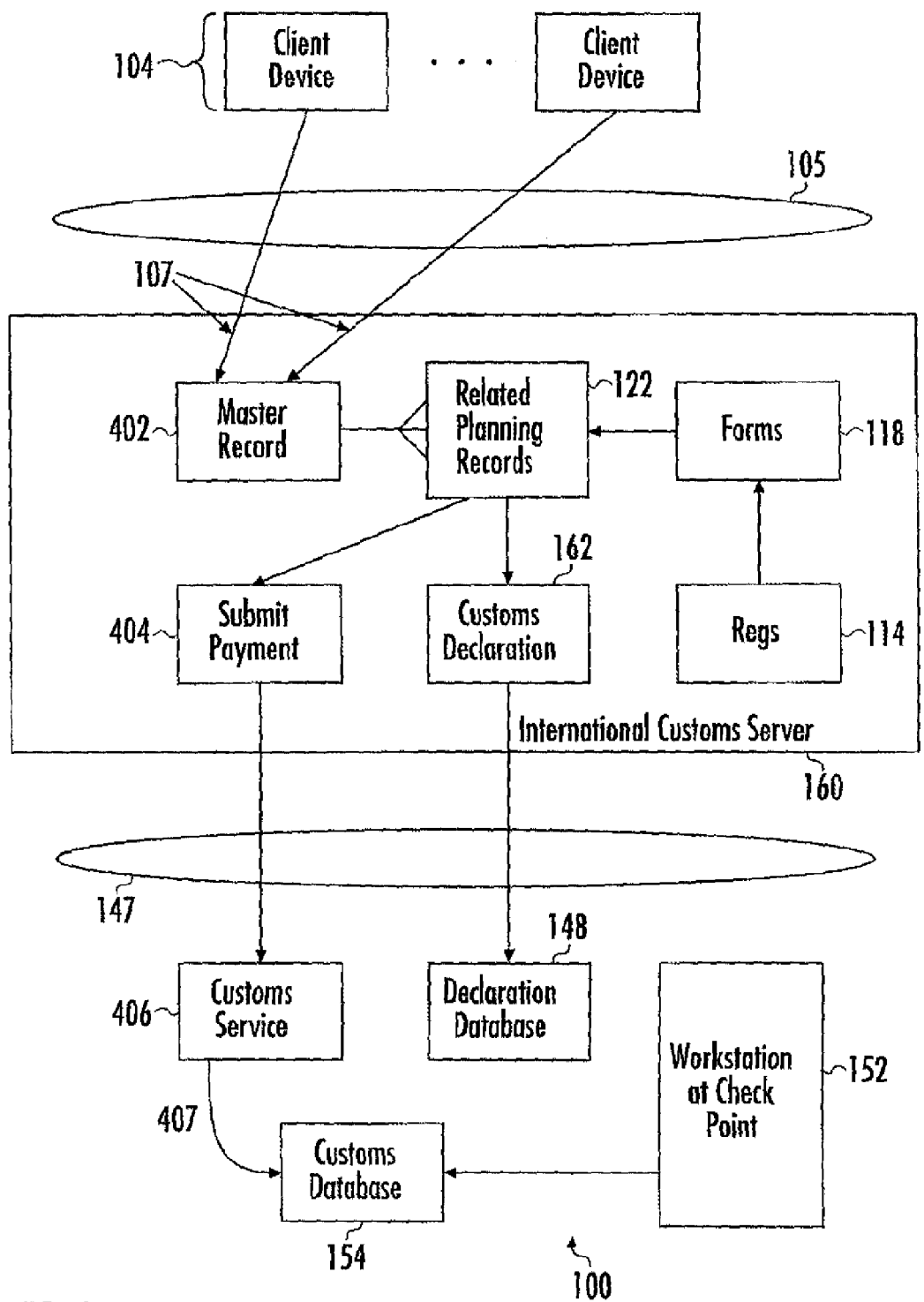
FIG. 4 is a block diagram of an alternative embodiment of the invention.

Turning now to FIG. 4, a first aspect of the invention is seen embodied as a system (100) for facilitating international customs planning and clearance. The illustrated embodiment comprises an international customs server (160) where the international customs server itself includes means for creating and storing in response to signals (107) communicated through client devices (104) master customs planning records (402) and related customs planning records (122). The illustrated embodiment includes means for creating (160), in response to signals (107) communicated through client devices (104) master customs planning records (402) and related customs planning records (122) to be stored within an international customs server (160). The client devices in typical embodiments, as in the embodiment shown in FIG. 4, are coupled for data communications through an internet (105) to the international customs server (160). The international customs server is means for creating master customs planning records and related customs planning records in that the server is a collection of computer programs installed and operating upon one or more computers including computer processors and computer memory. In the illustrated embodiment, the international customs server itself comprises master customs planning records (402), related customs planning records (122), customs planning record forms (118), customs regulations (114), and declaration forms (162).

In the embodiment of FIG. 4, the customs regulations are customs rules and regulations, organized by country, governing import and export of goods to and from countries. The customs planning record forms (118) comprise data structures containing data elements identifying and setting forth information pertinent to customs clearance in destination countries. The customs planning record forms (118) in typical embodiments are defined in dependence upon the customs regulations (114).

In the illustrated embodiment, the related customs planning records are data structures that identify and describe a particular importation of goods into a destination country, an event of international customs planning and clearance upon one occasion for an importer. The structure of the related customs planning records, that is, the data elements within the related customs planning records, are derived from the customs planning record forms (118). In the illustrated embodiment, the declaration forms (162) are official declaration forms prepared on-line within the international customs server using information entered by an importer into a related customs planning record.

In embodiments of the kind illustrated in FIG. 4, the related customs planning records are 'related' to master customs planning records (402). The related customs planning records in typical embodiments are 'related' to master customs planning records (402) through one or more foreign key fields containing data identifying the master customs planning records to which related customs planning records are related.

Figure 6:
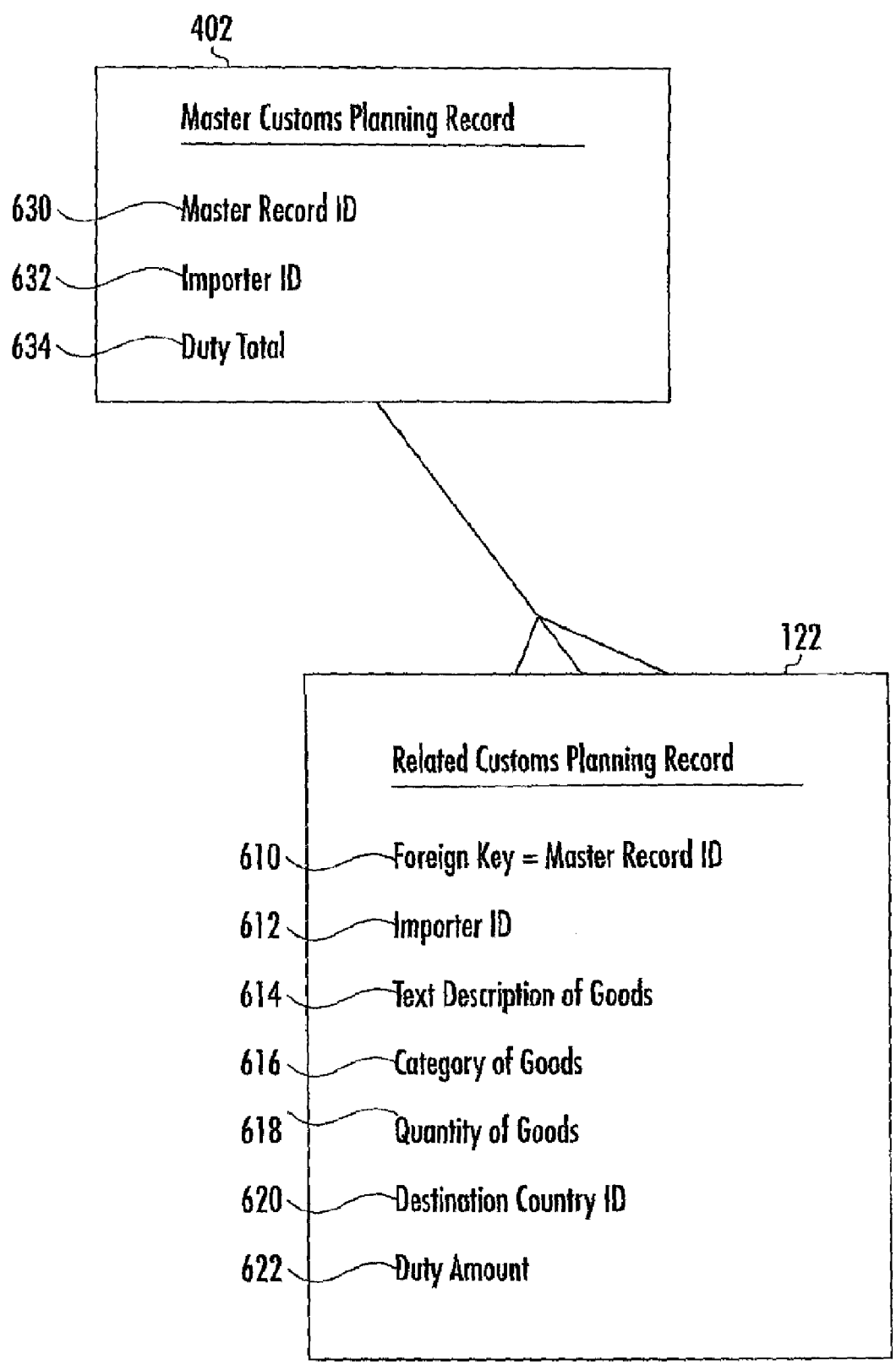
FIG. 6 is a data structure diagram of exemplary embodiments of master custom planning records and related customs planning records.

FIG. 6 illustrates a more detailed embodiment of master customs planning records, related customs planning records, and the relationship between them. In the embodiment illustrated in FIG. 6, at least one master customs planning record (402) is related 'one-to-many' to one or more related customs planning records (122). The relationship in the illustrated embodiment is implemented through a master record identification code (630) in the master customs planning record and a foreign key field (610) in the related customs planning record. The master customs planning record include a duty total field (634) in which is stored, in typical embodiments, a total amount of duty for one or more of the related customs planning records to which a master customs planning record is related. That is, in typical embodiments, related customs planning records include duty amount fields (622) in which is stored an amount of duty calculated for importation of goods described in the related customs planning records, and a running total of the amounts of duty in a multiplicity of related customs planning records is stored in a duty total field in the master customs planning record to which the related customs planning records are related.

The system embodiment as shown in FIG. 4 is capable of preparing declaration forms (162) on-line and forwarding them electronically to a customs database (148) in a destination country. In typical embodiments, the electronic forwarding is accomplished via an internet (147). Declaration forms in a destination country's declaration forms database are available for use by customs personnel through customs workstations (152). Upon import of goods into a destination country, in typical embodiments, a customs workstation is capable of forwarding a completed and approved electronic customs form to a central or national customs database (154), such as, for example, the one known in the United States as "ACS," the Automated Commercial System that the United States uses to track, control, and process all commercial imports. As of this writing, the example ACS is scheduled in the United States for a massive upgrade known as "ACE," the Automated Commercial Environment.

System embodiments of the kind shown in FIG. 4 typically include a capability of submitting payment for duty. Such embodiments include means for paying duty to the country into which goods are to be imported. Such payments in typical embodiments are in effect prepayments of duty paid before the goods are physically imported into a destination country. In typical embodiments, the duty is paid by use of any known on-line payment means, including for example, on-line credit card payments. Some embodiments include printers coupled to client devices capable of printing receipts for payments of duty. Most embodiments record the duty payments in a customs database in a destination country to which goods are to be imported.

Typical customs clearance facilities include passages for travelers having nothing to declare. In order to audit the good faith of travelers who represent that they have nothing to declare, customs agents randomly select for inspection luggage of travelers who are exiting through passages for travelers having nothing to declare. After paying or 'prepaying' duty on-line, traveling importers, for example, clear customs by exiting a customs checkpoint through a passage for travelers having nothing to declare. Traveling importers who, by use of an embodiment of the present invention, have prepaid duty on dutiable goods for import have in effect already cleared customs by declaring dutiable goods and paying the duty. When such traveling importers are stopped for luggage checks and dutiable goods are discovered in their luggage, the duty on such goods has already been paid, evidenced by optional printed receipts and data entries (407) in customs databases (154) accessible at customs checkpoints (152). In describing the operation of the invention in terms of traveling importers, there is no limitation of the invention to use by non-commercial importers. The invention is equally useful to commercial importers as well as non-commercial importers.

In accordance with the illustrated embodiment, the client devices (104) in some embodiments are wireless devices; in other embodiments, client devices are coupled electronically to an international customs server. The client devices in various embodiments of the invention include workstations in kiosks at airports, workstations installed in the backs of passenger chairs in airplanes, personal computers, and hand-held personal data administrators. Persons skilled in art will realize that any device capable of functioning as a client or terminal to computer application software comprising a server, any device capable of supporting an internet connection, any device capable of supporting a web client or browser in client-server environments or the environment of the World Wide Web is useful as a client device within the scope of the present invention. In fact, there are many different kinds of such devices that will occur to those of skill in the art, and all of them useful as described are well within the scope of the invention.

Figure 5:
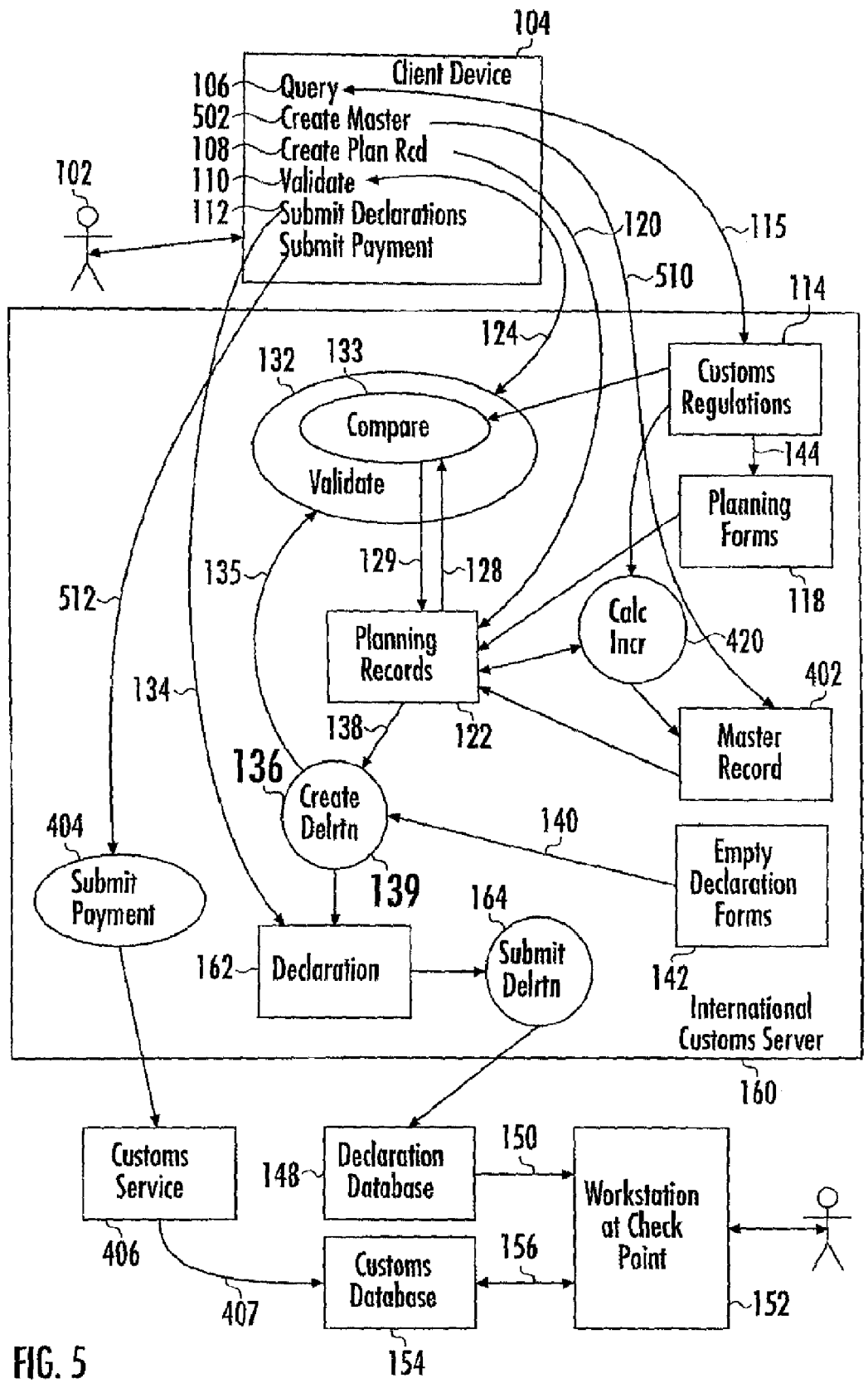
FIG. 5 is a process flow diagram of various exemplary aspects and embodiments of the invention.

Turning now to FIG. 5, a first aspect of the invention is seen illustrated as a method for facilitating customs planning and clearance. In typical embodiments, the method includes creating (502) in an international customs server (160), in response to a signal (510) communicated through a client device (104) coupled for data communications through at least one internet connection to the international customs server, a master customs planning record (402). In typical embodiments as illustrated in FIG. 6, the master customs planning record includes a master identification field (630) in which is stored a master identity code for the master customs planning record, and a duty total field (634) in which is stored the total amount of duty to be paid on goods identified in related customs planning records.

In typical embodiments of the kind illustrated in FIG. 5, the method also includes creating (108) in an international customs server (160) a related customs planning record (122), wherein the related customs planning record is related through a foreign key field (610) to the master customs planning record (402). In typical embodiments, as illustrated in FIG. 6, the related customs planning record includes the foreign key field (610) in which is stored the master identity code of the master customs planning record, one or more description fields (614, 616, 618) describing the goods for import to a destination country, the destination country having an identity, a duty amount field (622) in which is stored an amount of duty to be paid on the goods; and the identity of the destination country (620).

In typical embodiments of the kind illustrated in FIG. 5, the method includes calculating (420) duty on the goods described in the related customs planning record. In typical embodiments, the method also includes storing the amount of the calculated duty in the duty amount field in the related customs planning record. In typical embodiments, the method further includes incrementing (420), by the amount of the calculated duty stored in the duty amount field in the related customs planning record, the total amount of duty stored in the duty total field in the master customs planning record.

Embodiments of the kind illustrated in FIG. 6 typically include one or more fields describing goods for import in the related customs planning records. The fields used for describing goods for import typically include a text description field (614) in which is stored a textual description of the goods for import, a category field (616) in which is stored a code identifying the category of the goods for import; and a quantity field (618) in which is stored the quantity of goods for import.

Turning back to FIG. 5, in typical embodiments of the invention each related customs planning record typically represents a prospective importation into a destination country of a quantity of goods of a category. Typical embodiments of the kind illustrated include creating (136), in dependence upon the related customs planning record, a customs declaration form (162) for a destination country and submitting (164) the customs declaration form to a customs declaration forms database for the destination country. Typical embodiments also include submitting (404), to the customs service (406) of the destination country, payment of the duty.

In accordance with the illustrated embodiment, the client devices (104) can be wireless devices or they can be coupled electronically to the international customs server. The client devices in various embodiments of the invention include workstations in kiosks at airports, workstations installed in the backs of passenger chairs in airplanes, personal computers, and hand-held data administrators. Persons skilled in the art will realize that any device capable of functioning as a client or terminal to computer application software comprising a server, any device capable of supporting an internet connection, any device capable of supporting a web client or browser in client-server environments or the environment of the World Wide Web is useful as a client device within the scope of the present invention. In fact, there are many kinds of such devices that will occur to those of skill in the art, and all of them useful as described are well within the scope of the invention.

In typical embodiments of the kind illustrated in FIG. 6, the master customs planning record further comprises an importer identification field (632) in which is stored an identity of an importer. In typical embodiments, the related customs planning record further include an importer identification field (612) in which is stored an identity of an importer.

Turning back to FIG. 5, typical embodiments include an international customs server that is a software application installed and operating on one or more computers. The software application includes software routines storing and retrieving related customs planning records, validating (132) goods described in related customs planning records against customs regulations stored in customs regulations databases, and submitting (164) to customs databases declaration forms prepared in dependence upon the related customs planning records.

Embodiments of the kind illustrated typically include creating in dependence upon the related customs planning record, a customs declaration form for the destination country, as well as reading customs data from a related customs planning record and inserting the read customs data into a declaration form (138). Embodiments of the kind illustrated typically include submitting the customs declaration form to a customs declaration forms database for the destination country. In typical embodiments, submitting the declaration form includes communicating the form as electronic data communications through at least one data communications connection. In typical embodiments, the data communications connection is an internet connection.

Embodiments of the kind illustrated in FIG. 5 typically include a capability of validating (132) goods described in a related customs planning record. In typical embodiments, validating the goods described in the related customs planning records includes comparing (133) the goods described by customs data in the related customs planning record (122) to customs regulations (114) governing the goods described by the customs data in the related customs planning record and reporting to an importer through the client device (104) a result of the comparison. In some embodiments, validating includes storing (129) the result of the comparison in the related customs planning record.

In typical embodiments of the kind illustrated, the related customs planning record contains data elements needed to support customs clearance in the destination country because the related customs planning record contains data elements derived from a related customs planning record form (118) that is fashioned in dependence upon the customs regulations of the destination country.

Figure 3:
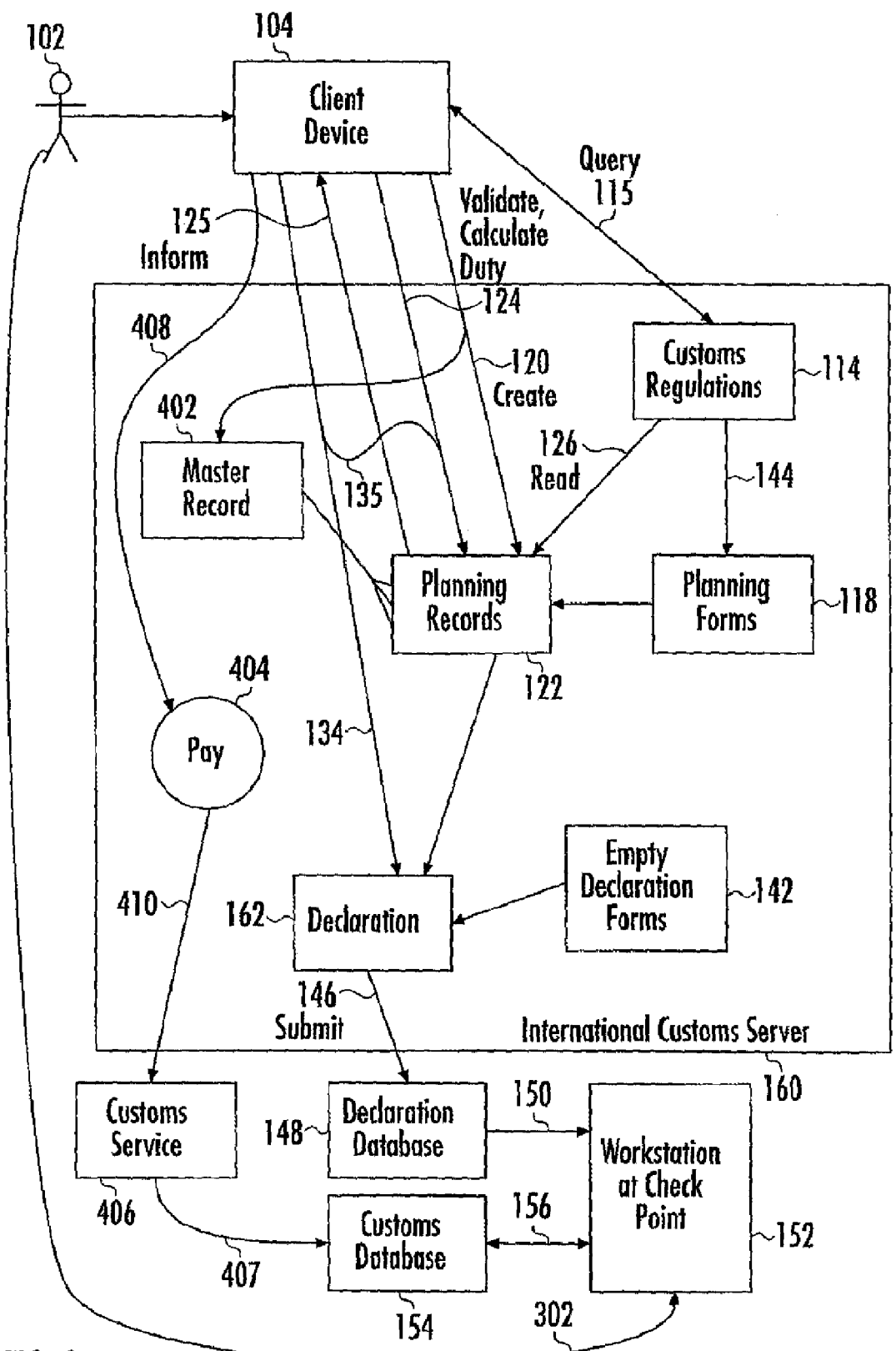
FIG. 3 is a process flow diagram of exemplary embodiments illustrating a use case.

Turning now to FIG. 3, a further aspect of the invention is illustrated in a use case. In an embodiment as shown in FIG. 3, an importer (102) uses a client device (104) to query (115) a customs regulations database (114) in an international customs server (160). The query (115) accepts from the importer through the client device information describing a prospective importation of goods into a particular country, including, for example, category of goods (for example, food, ammunition, firearms, alcohol, or drugs), descriptions of goods, quantities of goods, country of origin, and destination country. The query then reads a regulations (114) database in dependence upon the information describing a prospective importation of goods and advises the importer of the customs regulations for a destination country. If, for example, the importer is traveling with goods for import to the United States asserting a query regarding rules for importing goods to the United States, the query advises the importer that the importer must submit a Customs Declaration Form CF-6059B. If the importer has had goods shipped directly from England to the importer's place of business in the United States, the query advises the importer that the importer will need a Declaration Of Unaccompanied Articles, U.S. Customs Form CF-255. In typical embodiments, the query advises the importer also of additional rules of the destination country regarding imports such as limitations regarding countries of origin or particular categories of goods such as alcohol or tobacco. In typical embodiments, the query advises the importer also whether goods described in a query are dutiable, and if goods are dutiable, the rules for calculating the duty. In some embodiments, the query also calculates and informs the importer of the amount of duty that is payable on imports of certain quantities of goods in certain categories of import. Alternatively to beginning with a query, the importer proceeds directly to preparation (120) of a master customs planning record (402) and at least one related customs planning record (122).

In the example use case as illustrated in FIG. 3, the importer (102) signals the international customs server to create (120) a master customs planning record (402) within the international customs server (160). Creating (120) a master customs planning record (402) typically involves creating also at least one related customs planning record (122). In typical embodiments, a master customs planning record represents a related group of prospective importations of goods, and related customs planning records represent prospective importations of particular goods or quantities of particular goods into particular countries. For example, in a case where a traveling importer will visit several countries on a single trip, the traveling importer typically will create a master customs planning record to function as a header record for imports associated with the trip and will also create several related customs planning records representing prospective importation of particular goods into particular countries to which the traveling importer will travel on the particular trip.

In typical usage, the importer decides based upon a query (115) that the importer reasonably can expect to clear customs without difficulty in the importer's destination country. The importer then signals creation of (120) a customs planning record (122) describing a goods to be imported, their countries of origin, their categories, whether the goods are alcohol, tobacco, firearms, ammunition, drugs, medicines, and so on, and whatever other information is needed to support customs clearance in the destination country. The customs planning record (122) contains data elements needed to support customs clearance in the destination country because the customs planning record contains data elements derived from a customs planning record form (118) that is fashioned in dependence (144) upon the customs regulations (114) for the destination country.

After creating a customs planning record describing the imports under consideration, in typical usage of the embodiment illustrated in FIG. 3, the importer validates (124) the goods described in the customs planning record for likelihood of customs clearance in the destination country. The international customs server validates the goods described in the customs planning record by comparing (126) the information in the customs planning record with the information in the customs regulations regarding imports to the destination country. Validating includes informing (125) the importer through the client device whether the information provided by the importer in the customs planning record, as compared with the customs regulations for the destination country, indicates any potential difficulties regarding the importer's importing particular goods into the destination country. In many embodiments, validating (124) a prospective importation of goods includes calculating the duty payable upon importation. In other embodiments, duty calculations are implemented independently of the validation process. Either way, typical embodiments support calculation of duty and storing of calculated duty in the related customs planning records. Typical embodiments include also summing a total duty across a multiplicity of related customs planning records and storing the amount of the total duty in a total duty field in the master customs planning record to which the multiplicity of related customs planning records are related.

Having queried the customs regulations (115), created a customs planning record (120), and validated (124) the goods described in the customs planning record, the importer in typical usage has confidence that the importer will be able to clear customs without unexpected exclusions or duties in the destination country. Alternatively, the importer decides based merely upon the query that the importer is reasonably likely to have no difficulties with customs clearance in the destination country and therefore proceeds to create and submit a declaration form without validating the customs planning record. Either way, if the importer decides to proceed with the import in question, the importer in typical usage orders through the client device the creation (134) and submission (146) to a declaration forms database (148) in the destination country or port of entry an official on-line declaration form (162) for the destination country.

As mentioned earlier, many embodiments calculated duty as part of the validation process. Other embodiments calculate duty as part of preparation of an on-line customs declaration form. Regardless when it is done in the overall process of the invention, typical embodiments do include calculation of duty, storing of calculated duty in related customs planning records, and summing calculated duty across related customs planning records for storage in a master customs planning record. Many embodiments, in support of import planning, include capabilities of subtotaling duty across related customs planning records for a particular category of goods, for a particular destination country, or for other ways of organizing goods for subtotals across related customs planning records.

Having submitted a declaration form to the destination country, in typical usage, the importer then pays (404) any duty calculated to be due on goods to be imported to the destination country to which a declaration form has been submitted. The payment function (404) in the illustrated embodiment, functions in response to a signal (408) or instruction from the client device (104), reads duty amounts from related customs planning records (122), and submits (410) electronic payment in electronic form to a destination country. In the illustrated embodiment of FIG. 3, electronic payment is submitted to the customs service (406) in the destination country. In various embodiments, electronic payment takes the form of secure credit card payments, wire transfers, or forms of payment specialized for the World Wide Web. Many forms of electronic payment will occur to those of skill in the art, all of them being well within the scope of the present invention.

When the importer arrives (302) in the customs area at the port of entry in the destination country, a declaration form (162) is available to customs personnel on customs workstations (152), and any duty due on goods imported by the importer is already paid. When the importer clears customs in the destination country, usage of the illustrated embodiment includes available printing of the customs clearance receipts and forms pertinent to the particular destination country. In the illustrated example embodiment, the importer clears customs by simply walking through the customs exit for persons with nothing to declare. If the importer's baggage is caught by a random inspection, customs inspectors will discover dutiable goods that have been declared as dutiable and upon which duty has already been paid.

In cases where an importer is confident of customs clearance without difficulty in a destination country, as when for example the importer has recently traveled to the destination country and therefore knows that the importer is unlikely to have goods denied importation or have goods subjected to unexpected duties, then the importer typically does not effect a query (115) or a validation (124). In such cases, the importer proceeds directly to creation (120) of a master customs planning record (402) and at least one customs planning record (122) and creation and submission of a declaration (162). In some embodiments of the invention, creating (134) a customs planning record automatically triggers (135) validation, so that importers can always be assured of being informed of risks, if any, of encountering import difficulties in the destination country.

In typical usage of embodiments of the inventions there is no requirement for the importer to touch a piece of paper, although the importer naturally optionally prints a copy of the declaration and duty receipt if the importer wishes to do so. In usage of typical embodiments, there is no need for an importer to wait until the importer is on an airplane nearly at a port of entry in the destination country before filling out a declaration form. On the contrary, in typical usage, importers prepare on-line and submit to customs databases worldwide declaration forms and duty payments from anywhere in the world or in outer space, so long as a data communications connection is available from a client device to an international customs server of the present invention. In usage of typical embodiments, there is no need for an importer to wait until the importer is on the ground in a port of entry of a destination country to discover the importer's relative likelihood of encountering unexpected exclusion of goods or unexpected duties. In usage of typical embodiments, importers plan their imports by knowing in advance which goods are importable and what the duty on goods will be. Importers in using the invention include or exclude imports and alter their purchasing plans according to the total amount of duty budgeted by the importers for a trip or a period of time as compared with the total duty summed by use of the invention.

It will be understood from the foregoing description that various modifications and changes may be made in the various embodiment of the present invention without departing from its true spirit. It is intended that this description of exemplary embodiments is for purposes of illustration only and should not be construed in a limiting sense. The scope of this invention should be limited only by the language of the following claims.

What is claimed is:

1. A system for facilitating customs planning and clearance, the system comprising:
   means for creating in an international customs server, in response to a signal communicated through a client device coupled for data communications through at least one internet connection to the international customs server, a master customs planning record, wherein the master customs planning record comprises:
   a master identification Field in which is stored a master identity code for the master customs planning record, and
   a duty total field in which is stored the total amount of duty to be paid on goods identified in related customs planning records;
   means for creating in an international customs server a related customs planning record, wherein the related customs planning record is related through a foreign key field to the master customs planning record, wherein the related customs planning record comprises:
   the foreign key held in which is stored the master identity code of the master customs planning record;
   one or more description fields describing the goods for import to a destination country, the destination country having an identity;
   a duty amount field in which is stored an amount of duty to be paid on the goods; and
   the identity of the destination country;
   means for calculating duty on the goods described in the related customs planning record;
   means for storing the amount of the calculated duty in the duty amount field in the related customs planning record; and
   means for incrementing, by the amount of the calculated duty stored in the duty amount field in the related customs planning record, the total amount of duty stored in the duty total field in the master customs planning record.

2. The system of claim 1 wherein the one or more fields describing goods for import in the related customs planning records comprise:
   a text description field in which is stored a textual description of the goods for import;
   a category field in which is stored a code identifying the category of the goods for import; and
   a quantity field in which is stored the quantity of goods for import.

3. The system of claim 1 wherein each related customs planning record represents a prospective importation into a destination country of a quantity of goods of a category.

4. The system of claim 1 further comprising means for creating, in dependence upon the related customs planning record, a customs declaration form for a destination country.

5. The system of claim 1 further comprising means for submitting the customs declaration form to a customs declaration forms database for the destination country.

6. The system of claim 1 further comprising means for submitting, to the customs service of the destination country, payment of the duty.

7. The system of claim 1 wherein the client device is a workstation in a kiosk at an airport.

8. The system of claim 1 wherein the client device is a workstation installed in the back of a passenger chair in an airplane.

9. The system of claim 1 wherein the client device is a personal computer.

10. The system of claim 1 wherein the client device is a hand-held personal data administrator.

11. The system of claim 1 wherein the at least one internet connection is wireless.

12. The system of claim 1 wherein the master customs planning record further comprises an importer identification field in which is stored an identity of an importer.

13. The system of claim 1 wherein the related customs planning record further comprises an importer identification field in which is stored an identity of an importer.

14. The system of claim 1 wherein the international customs server is a software application installed and operating on one or more computers, the software application further comprising computer hardware and software comprising means for storing and means for retrieving related customs-planning records, means for validating goods described in related customs planning records against customs regulations stored in customs regulations databases, and means for submitting to custom databases declaration forms prepared in dependence upon the related customs planning records.

15. The system of claim 1 wherein means for creating in dependence upon the related customs planning record a customs declaration form for the destination country further comprises means for reading customs data from a related customs planning record and means for inserting the read customs data into a declaration form.

16. The system of claim 1 wherein means for submitting the customs declaration form to a customs declaration forms database for the destination country further comprises means for communicating the form as electronic data communications through at least one internet connection.

17. The system of claim 1 further comprising means for validating goods described in a related customs planning record.

18. The method of claim 17 wherein means for validating the related customs planning records further comprises means for comparing the goods described by customs data in the related customs planning record to customs regulations governing the goods described by the customs data in the related customs planning record and means for reporting to an importer through the client device a result of the comparison.

19. The method of claim 18 further comprising means for storing the result of the comparison in the related customs planning record.

20. The system of claim 1 wherein the related customs planning record comprises a related customs planning record form having a structure, wherein the structure of the related customs planning record form is dependent upon customs regulations.

21. A computer program product for facilitating customs planning and clearance, the computer program product comprising:
   a recording medium;
   means, recorded on the recording medium, for creating in an international customs server, in response to a signal communicated through a client device coupled for data communications through at least one internet connection to the international customs server, a master customs planning record, wherein the master customs planning record comprises:
   a master identification field in which is stored a master identity code for the master customs planning record, and
   a duty total field in which is stored the total amount of duty to be paid on goods identified in related customs planning records;
   means, recorded on the recording medium, for creating in an international customs server a related customs planning record, wherein the related customs planning record is related through a foreign key field to the master customs planning record, wherein the related customs planning record comprises:
   the foreign key field in which is stored the master identity code of the master customs planning record;
   one or more description fields describing the goods for import to a destination country, the destination country having an identity;
   a duty amount field in which is stored an amount of duty to be paid on the goods; and
   the identity of the destination country;
   means, recorded on the recording medium, for calculating duty on the goods described in the related customs planning record;
   means, recorded on the recording medium, for storing the amount of the calculated duty in the duty amount field in the related customs planning record; and
   means, recorded on the recording medium, for incrementing, by the amount of the calculated duty stored in the duty amount field in the related customs planning record, the total amount of duty stored in the duty total field in the master customs planning record.

22. The computer program product of claim 21 wherein the one or more fields describing goods for import in the related customs planning records comprise:
   a text description field in which is stored a textual description of the goods for import;
   a category field in which is stored a code identifying the category of the goods for import; and
   a quantity field in which is stored the quantity of goods for import.

23. The computer program product of claim 21 wherein each related customs planning record represents a prospective importation into a destination country of a quantity of goods of a category.

24. The computer program product of claim 21 further comprising means, recorded on the recording medium, for creating, in dependence upon the related customs planning record, a customs declaration form for a destination country.

25. The computer program product of claim 21 further comprising means, recorded on the recording medium; for submitting the customs declaration form to a customs declaration forms database for the destination country.

26. The computer program product of claim 21 further comprising means, recorded on the recording medium, for submitting, to the customs service of the destination country, payment of the duty.

27. The computer program product of claim 21 wherein the client device is a workstation in a kiosk at an airport.

28. The computer program product of claim 21 wherein the client device is a workstation installed in the back of a passenger chair in an airplane.

29. The computer program product of claim 21 wherein the client device is a personal computer.

30. The computer program product of claim 21 wherein the client device is a hand-held personal data administrator.

31. The computer program product of claim 21 wherein the at least one internet connection is wireless.

32. The computer program product of claim 21 wherein the master customs planning record further comprises an importer identification field in which is stored an identity of an importer.

33. The computer program product of claim 21 wherein the related customs planning record further comprises an importer identification field in which is stored an identity of an importer.

34. The computer program product of claim 21 wherein the international customs server is a software application installed and operating on one or more computers, the software application further comprising computer hardware and software comprising means, recorded on the recording medium, for storing and means, recorded on the recording medium, for retrieving related customs planning records, means, recorded on the recording medium, for validating goods described in related customs planning records against customs regulations stored in customs regulations databases, and means, recorded on the recording medium, for submitting to customs databases declaration forms prepared in dependence upon the related customs planning records.

35. The computer program product of claim 21 wherein means, recorded on the recording medium, for creating in dependence upon the related customs planning record a customs declaration form for the destination country further comprises means, recorded on the recording medium, for reading customs data from a related customs planning record and means, recorded on the recording medium, for inserting the rend customs data into a declaration form.

36. The computer program product of claim 21 wherein means, recorded on the recording medium, for submitting the customs declaration form to a customs declaration forms database for the destination country further comprises means, recorded on the recording medium, for communicating the form as electronic data communications through at least one internet connection.

37. The computer program product of claim 21 further comprising means, recorded on the recording medium, for validating goods described in a related customs planning record.

38. The method of claim 37 wherein means, recorded on the recording medium, for validating the related customs planning records further comprises means, recorded on the recording medium, for comparing the goods described by customs data in the related customs planning record to customs regulations governing the goods described by the customs data in the related customs planning record and means, recorded on the recording medium, for reporting to an importer through the client device a result of the comparison.

39. The method of claim 38 further comprising means, recorded on the recording medium, for storing the result of the comparison in the related customs planning record.

40. The computer program product of claim 21 wherein the related customs planning record comprises a related customs planning record form having a structure, wherein the structure of the related customs planning record form is dependent upon customs regulations.

* * * * *